(12) United States Patent
Burton

(10) Patent No.: US 8,225,289 B2
(45) Date of Patent: Jul. 17, 2012

(54) METHOD AND SYSTEM FOR IMPROVED TOOL INTERACTION WITH A TARGET

(75) Inventor: Felix Burton, San Mateo, CA (US)

(73) Assignee: Wind River Systems, Inc., Alameda, CA (US)

( * ) Notice: Subject to any disclaimer, the term of this patent is extended or adjusted under 35 U.S.C. 154(b) by 914 days.

(21) Appl. No.: 12/042,102

(22) Filed: Mar. 4, 2008

(65) Prior Publication Data
US 2009/0228861 A1 Sep. 10, 2009

(51) Int. Cl.
*G06F 9/44* (2006.01)
(52) U.S. Cl. .......... 717/124; 717/130
(58) Field of Classification Search .......... None
See application file for complete search history.

(56) References Cited

U.S. PATENT DOCUMENTS

| | | | |
|---|---|---|---|
| 6,915,509 B1 * | 7/2005 | Chkodrov et al. | 717/124 |
| 2008/0250400 A1 * | 10/2008 | Vertes | 717/158 |

* cited by examiner

*Primary Examiner* — Ted T Vo
*Assistant Examiner* — Adam R Banes
(74) *Attorney, Agent, or Firm* — Fay Kaplun & Marcin, LLP

(57) ABSTRACT

A system and method for executing application code in an operating system environment, attaching a development tool to the application code, saving a state of the application code, determining whether the attachment of the development tool interrupted a blocking system call of the application code, modifying, when it is determined the attachment of the development tool interrupted the blocking system call, the saved state to a further saved state corresponding to restarting the blocking system call and restoring the state of the application code to the further saved state.

7 Claims, 3 Drawing Sheets

METHOD AND SYSTEM FOR IMPROVED TOOL INTERACTION WITH A TARGET

BACKGROUND

Programmers who are developing software to operate on mobile or embedded computing devices may typically write and develop code on a development host while monitoring its execution on a target device. In such situations, programmers may wish to control the operation of code on the target device, such as by creating and monitoring system calls. Ideally, they should be able to do so by entering commands on the development host and having those commands executed as if they had been generated by the target device.

SUMMARY OF THE INVENTION

A method for executing application code in an operating system environment, attaching a development tool to the application code, saving a state of the application code, determining whether the attachment of the development tool interrupted a blocking system call of the application code, modifying, when it is determined the attachment of the development tool interrupted the blocking system call, the saved state to a further saved state corresponding to restarting the blocking system call and restoring the state of the application code to the further saved state.

A method for executing application code in an operating system environment, injecting, by a development tool, a system call into the application code, the system call being processed by the operating system and retrieving, by the development tool, a result of the processing of the system call by the operating system.

In addition, corresponding systems to perform the above described methods.

DETAILED DESCRIPTION

Figure 1:
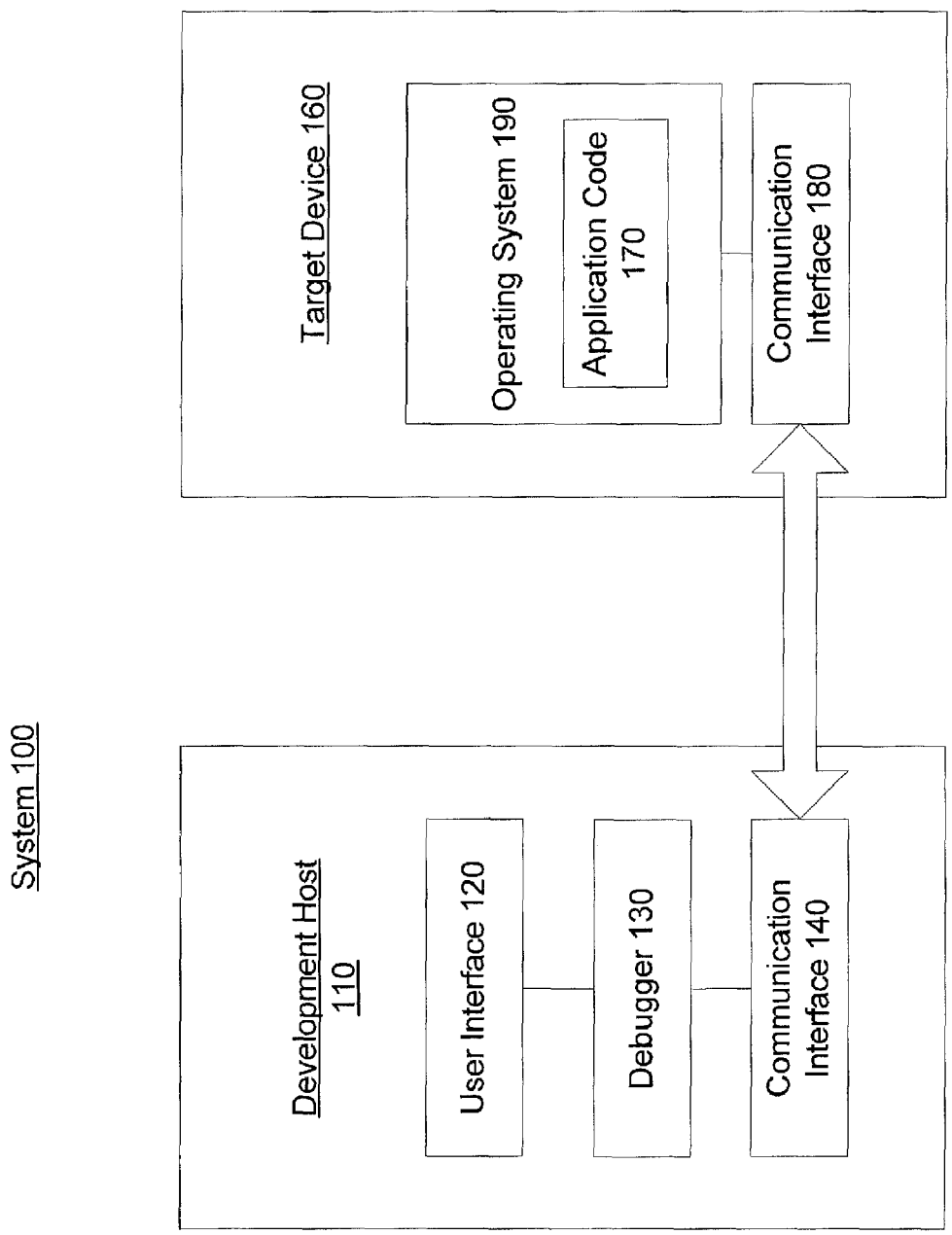
FIG. 1 shows an exemplary system for implementing system call injection according to the present invention.

The exemplary embodiments of the present invention may be further understood with reference to the following description and the appended drawings, wherein like elements are referred to with the same reference numerals. The exemplary embodiments of the present invention describe methods and systems for improving the utility of system calls created by debuggers and other tools for monitoring the operation of other applications. It is noted that while the exemplary embodiments are described with reference to a cross development environment, the exemplary embodiments of the present invention are equally applicable to native development platforms.

It should be noted that throughout this description the term "application" is used to describe the code that is intended to be executed on a target device, whether or not that code currently resides on the target device. The term "tool" is used to describe a software program (or portion of a software program) that aids a developer in creating, controlling, optimizing, etc. an application. A tool may be launched and executed in the development environment of a host or may also be launched and executed on the target device. A debugger is an example of a tool, but the exemplary embodiments of the present invention are not limited to debuggers. In addition, the exemplary embodiments are described with reference to Unix and/or Posix style operating systems. However, those skilled in the art will understand that the present invention may be applied to any type of operating system.

Software developers may typically wish to execute application code that is in development and monitor its performance to determine how to improve and optimize the code. For example, when code is being developed for a Unix or POSIX operating system, debuggers and other types of tools monitoring the execution of a segment of application code may use a ptrace( ) system call to control the operation of the application code. However, attaching to an application that is currently in executing a blocking system call (e.g., a synchronous I/O call, etc.) may cause the system call to return an error (e.g., EINTR) indicating that the system call was interrupted. Some operating systems will attempt to restart automatically, but there is no guarantee that the restart will be successful. It may also be desirable for a debugger or other tool to be able to interact with the target operating system on behalf of the application code. One such interaction that is beneficial is the injection of a system call by the tool.

FIG. 1 illustrates an exemplary system 100 according to the present invention for improving the functionality of such system calls. The system may include a development host 110 and a target device 160. The development host 110 may include a user interface, via which a user (e.g., a software developer) may accomplish various tasks. The development host 110 may include a tool (e.g., a debugger 130). It should be noted that while this exemplary embodiment specifically refers to a debugger, those of skill in the art will understand that the broader principles of the present invention may apply to any other type of tool that may monitor and control the operations of another, such as dynamic code patching tools, performance monitoring tools, tracing tools, loggers, etc. The development host 110 may further include a communication interface 140 for communicating with the target device 160; communication may be by any wired or wireless protocol capable of communicating the data described below.

The target device 160 may include application code 170 and an operating system 190. Typically, the application code 170 may be in development to operate on devices of the same type as the target device 160, but this need not be the case; for example, the application code 170 may be in development to operate on a device or various devices that use the same or similar operating systems as the target device 160, that use similar hardware to the target device 160, that have similar capabilities to the target device 160, etc. The target device 160 may further include a communication interface 180 for communicating with the development host 110 in the manner described above. Depending on the nature of the target device 160, it may include other elements (e.g., a display, a user interface, data storage, etc.), which are not shown in FIG. 1.

While FIG. 1 shows an exemplary embodiment wherein the debugger 130 resides on a first device (the development host 110) and the application code 170 resides on a second device (the target device 160), those of skill in the art will understand that other embodiments of the present invention may be applicable to a software development environment wherein all tasks related to development are performed on a single device.

Figure 2:
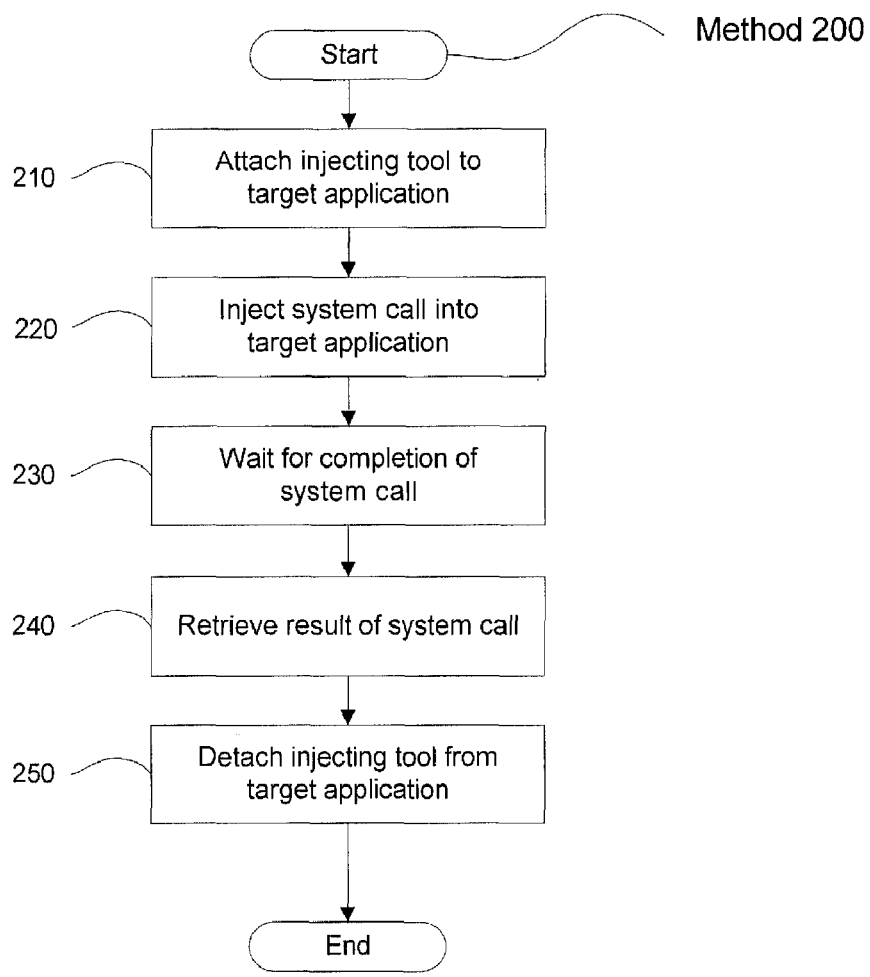
FIG. 2 shows a first exemplary method according to the present invention.

FIG. 2 illustrates a first exemplary method 200 for injecting system calls according to the present invention. The method 200 will be described specifically with reference to the system 100 of FIG. 1, but may be applied by any other software development environment wherein it may be desirable for a development tool to be able to inject system calls into code that is being developed and monitor the results. In this exemplary embodiment, it may be considered that the application code 170 is executing within the operating system 190 environment of the target device 160. The debugger 130 may be executing on the development host 110 and the debugger 130 may be controlled by a user via the user interface 120. Communication between the debugger 130 and the application code 170 and operating system 190 may be accomplished via the communication interfaces 140 and 180.

In step 210, the debugger 130 attaches itself to the application code 170; this step may insure that the debugger 130 has the proper privileges necessary to interact with the application code 170 and control its operation. Those skilled in the art will understand that there are many manners of attaching a software tool such as the debugger 130 to the application code 170 and the manner of making the attachment is generally dependent on the configuration of the tool.

In step 220, the debugger 130 injects a system call into the application code 170. This injection step initiates the system call in the application code 170. That is, the injection of the system call into the application code 170 by the debugger 130 will make it appear to the operating system 190 that the system call is being made by the application code 170 and not the separate development tool. The injection and subsequent execution of the system call may be performed in multiple manners. In one example, a separate thread in the execution process of the application code 170 may be created to perform the injected system call. In another example, the system call may take on the identity of an existing thread in the process.

In step 230, the debugger 130 waits for the system call to be completed by the application code 170. While the debugger 130 is waiting, the debugger 130 may perform other tasks. Once the system call has completed execution, the debugger 130 retrieves results from the application code 170 in step 240. Subsequently, in step 250, the debugger 130 detaches itself from the application code 170. After detaching, the method 200 terminates.

In a case where the attachment of the debugger 130 causes the application code 170 to stop (step 210), the injection of the system call (step 220) may automatically cause the application code 170 to resume. It should be noted that the attaching step 210 and the detaching step 250 are optional, and that in other exemplary methods for interfacing with application code that does not require attachment in order properly interact with the debugger, these steps may therefore not be performed.

The exemplary method 200 allows for the debugger 130 or a similar development tool to inject system calls into application code 170 as if the application code 170 itself had initiated the system calls. For example, if the application code 170 is running in protected space, the system calls would appear to be coming from the application code 170. In this manner, the debugger 130 may interact with the operating system 190 without the operating system 190 knowing that it was an external program. This may prevent unintended operation or side effects for the running application code 170. In addition, because the tool injects the system calls via the application code, the tool may be less dependent on the operating system and/or architecture of the target device.

Figure 3:
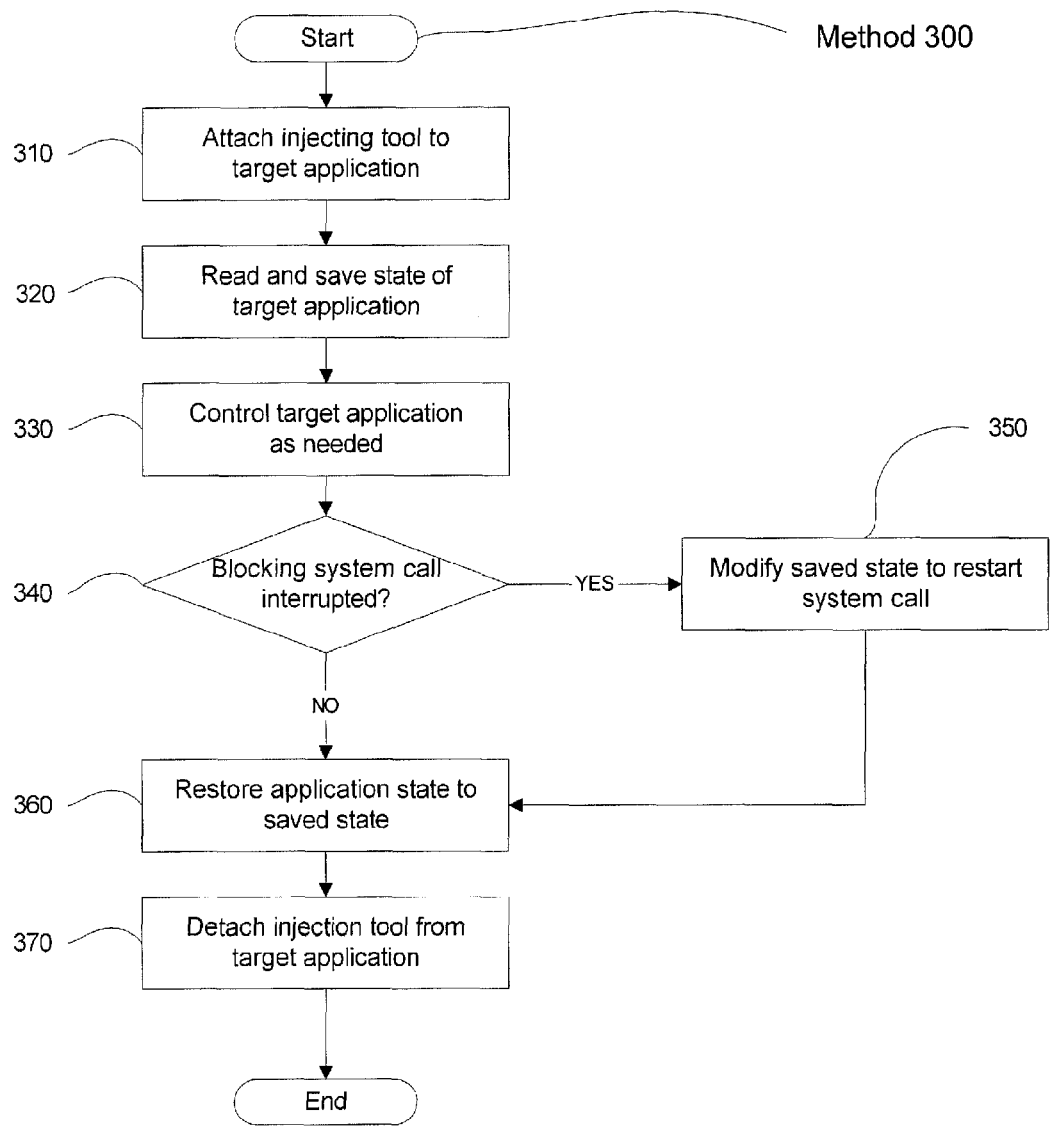
FIG. 3 shows a second exemplary method according to the present invention.

FIG. 3 illustrates a second exemplary method 300 according to the present invention. As with the method 200, this method 300 will be described with reference to the exemplary system 100 of FIG. 1, but may also be performed by any other suitable system. In step 310, the debugger 130 attaches to the application code 170. This attachment may be similar to that described above with reference to step 210 of method 200. It should be noted that, as for the exemplary method 200, step 310 of method 300 is not mandatory, but is merely provided to insure proper access to the application code 170 for the debugger 130. If the debugger 130 has proper access to the application code 170 without such attachment, then this step may optionally be eliminated. That is, the debugger 130 may not attach to the application code 170 in step 310, but may rather stop the execution of the application code 170 so that the debugger 130 may carry out its desired functions. Thus, the term "attach" should be understood to mean both attaching to the application code and/or stopping application code execution.

In step 320, the debugger 130 reads and saves the current state of the application code 170; storage may occur, for example, in a storage medium located on the development host 110. In step 330, the debugger 130 may control the application code 170 as required, e.g., the debugger 130 may perform the desired function(s) on the application code 170 or desired interactions with the operating system 190.

As described above, if the application code 170 was currently in a blocking system call when the debugger 130 was attached, the attachment may cause a change in the behavior of the application code 170 leading to the system call returning an error when the application code is resumed. This may result in a failure of the application code 170.

In order to handle such a situation, the exemplary method, in step 340, determines whether the debugger 130 has interrupted a blocking system call. One manner of determining whether the debugger 130 has interrupted a blocking system call is based on the application state. That is, by testing the target application state a determination may be made as to whether the application code 170 was woken up from a blocking system call and will return an error to the application due to the attachment or from some other reason e.g. a POSIX signal as part of the applications intended operation.

If the attachment of the debugger 130 interrupted a blocking system call, the method 300 continues at step 350, where the debugger 130 modifies the previously saved state (from step 320) to a new state that corresponds to a state where the blocking system call will be restarted. That is, a state where, when execution of the application code 170 is resumed, the blocking system call that was interrupted will be restarted.

After step 350, or if step 340 determines that a blocking system call has not been interrupted, the method proceeds to step 360. In step 360, the debugger 130 restores the state of the application code 170 that is currently saved. For example, if the attachment of the debugger 130 did not interrupt a blocking system call, the state saved in step 320 will be the currently saved state and the application code 170 will be restored to this state. However, if the attachment of the debugger 130 interrupted a blocking system call, then the modified saved state from step 350 will be the currently saved state and the application code 170 will be restored to this modified saved state.

In step 370, the debugger 130 detaches itself from the target application. Similar to the discussion of attaching in step 310 of the method 300, in step 370, the debugger 130 may not detach from the application code 170, but rather execution of the application code 170 may resume. Thus, the term "detach" should be understood to mean both detaching from the application code and/or resuming application code execution.

Thus, when the application code 170 resumes execution, the application code 170 will have a saved state corresponding to its state when the debugger 130 was attached (the state saved in step 320) or the modified saved state (step 350)

corresponding to the restarting of the blocking system call at the resuming of the execution it of the application code 170. The result of restoring the application code 170 to the modified saved state, if the application code 170 had been interrupted in the middle of a blocking system call, would be to restart the application code 170 without resulting in a failure state because the blocking system call would be restarted. Thus, the attachment of the debugger 130 and the subsequent control actions taken by the debugger 130 will not result in generating a failure of the application code 170. Following step 370, the method terminates.

The exemplary method 300 provides additional stability to the attachment of an external application or the injection of system calls into target code, such as the application code 170. Typically, such attachment or injection may cause the system call to return an error (e.g., EINTR). By storing and/or modifying the state of the application code 170, proper operation may be restored if an error will be generated.

Those skilled in the art will understand that the above described exemplary embodiments may be implemented in any number of manners, including as a separate software module, as a combination of hardware and software, etc. For example, the methods 200 and 300 may be a program containing lines of code that, when compiled, may be executed by a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    attaching a development tool to application code, the development tool being a program external to an operating system environment;
    executing the application code in the operating system environment;
    injecting, by the development tool, a system call into the application code, the system call being processed by the operating system environment, wherein the injecting causes the system call to appear to the operating system environment to have originated in the application code and not the development tool; and
    retrieving, by the development tool, a result of the processing of the system call by the operating system environment.

2. The method of claim 1, further comprising: detaching the development tool from the application code.

3. The method of claim 1, wherein, while the system call is being processed by the operating system environment, the development tool performs an unrelated task on the application code.

4. The method of claim 1, wherein the injecting of the system call includes one of creating a new processing thread to perform the system call and using an identity of an existing processing thread to perform the system call.

5. The method of claim 1, wherein the development tool is one of a debugger, a dynamic code patching tools, a performance monitoring tool, a tracing tool and a logger.

6. A system comprising a memory storing a set of instructions and a processor for executing the instructions, the instructions being operable to:
    attach a development tool to application code, the development tool being a program external to an operating system environment;
    execute the application code in the operating system environment;
    inject, by the development tool, a system call into the application code, the system call being processed by the operating system environment, wherein the injecting causes the system call to appear to the operating system environment to have originated in the application code and not the development tool; and
    retrieve a result of the processing of the system call by the operating system environment.

7. The system of claim 6, wherein the instructions are further operable to:
    detach the development tool from the application code.

* * * * *